March 4, 1924.

Re. 15,786

H. L. McGINTY

SPONGE CUP

Original Filed Aug. 20, 1920

Inventor:
Hugh L. McGinty,
By Fisher, Towle, Clapp & Sears
Attys.

Reissued Mar. 4, 1924. Re. 15,786

UNITED STATES PATENT OFFICE.

HUGH L. McGINTY, OF PITTSBURGH, PENNSYLVANIA, ASSIGNOR, BY MESNE ASSIGNMENTS, TO SENGBUSCH SELF-CLOSING INKSTAND COMPANY, OF MILWAUKEE, WISCONSIN, A CORPORATION OF WISCONSIN.

SPONGE CUP.

Original No. 1,405,142, dated January 31, 1922, Serial No. 404,842, filed August 20, 1920. Application for reissue filed January 14, 1924. Serial No. 686,221.

*To all whom it may concern:*

Be it known that I, HUGH L. McGINTY, a citizen of the United States, residing at Pittsburgh, in the county of Allegheny and State of Pennsylvania, have invented certain new and useful Improvements in Sponge Cups, of which the following is a specification.

This invention relates to sponge-cups and more particularly to sponge-cups used in offices and banks for the purpose of facilitating the handling or counting of paper sheets or paper money.

One of the main objects of the invention is to provide a sponge-cup in which the over-flowing of the water out of the cups, as often occurs in cups as used at the present, is eliminated. Another object is to provide such an improved cup of very compact and reduced dimensions in relation to the size of the sponge used. A further object is to provide a cup of cheap manufacture in which all parts are so shaped and proportioned as to enable the cup to be formed in a mold of simple construction. Further objects or advantages will appear from the following description and from the drawings which form part of this application for Letters Patent.

In the drawings:—

Figure 1:
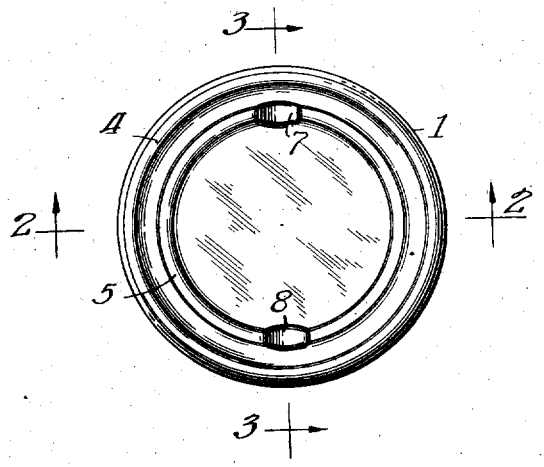
Fig. 1 is a top plan view of the device constructed in accordance with my invention.
Figure 2:
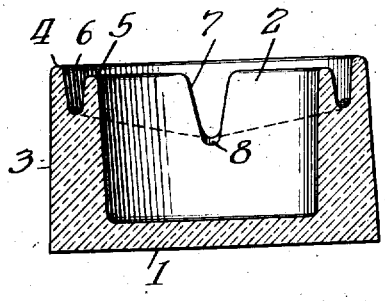
Fig. 2 is a sectional elevation taken on line 2—2 Fig. 1.
Figure 3:
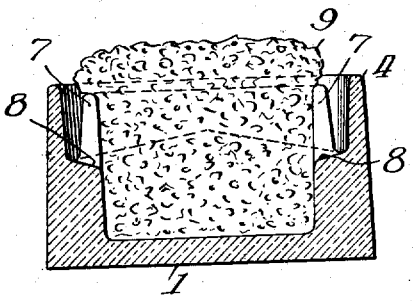
Fig. 3 is a sectional elevation taken on line 3—3, Fig. 1, showing a sponge as applied.

The device which may be made of glass, porcelain, or any other moldable and water proof material, is preferably made circular and consists of a body 1 having a circular depression or cup 2 of suitable size and depth; the wall 3 formed by this depression has its top so shaped as to form two concentric edges or rims 4 and 5, separated by the groove 6. The bottom of the latter is not level but is formed so as to present two high points and two low points so disposed that the high and low points will be respectively diametrically opposite each other. In the inner edge 5, and at points corresponding to the lowest levels of groove 6 the cuts or slots 7 with sloping bottom 8 are provided for the purpose of draining the water in the groove back into the cup 2, wherein the sponge 9 is located.

When it is desired to use the device, the sponge is saturated with water until the latter reaches approximately the bottom of the drain slots 7. As will be experienced, the pressure exerted by the fingers to be moistened, will compress the sponge sufficiently to force a certain amount of the water retained in the upper part of the sponge to ooze out and over-flow outside of the first ledge. In the ordinary sponge-cups, as now generally used, this naturally results in the water spilling over the border and creating unsightly pools upon the desk, or perhaps even damaging important documents which might happen to be in the vicinity of the sponge-cup. Incidentally, these all too frequent occurrences are often the cause of much valuable time and office material being wasted in cleaning and repairing the damage done by them. In my invention this danger due to the overflow of water is done away with by the use of the outer edge which, for greater precaution, is made somewhat higher than the inner edge. The expression of water from the sponge by the fingers is of course not prevented in my device but this effect will be rendered harmless by the water being drained by the inclined groove and returned into the center cup.

Referring to the drawings, it will be seen that the walls, edges and cuts are so tapered as to allow the cups being formed and drawn out of the mold directly, without requiring the setting and removal of loose pieces or collapsible mandrels. This labor saving feature of my invention is of great importance especially when concerning articles which are to be produced in great quantities. Furthermore, the width of the draining groove may be made relatively small without impairing its capacity for conducting the overflowing water, thereby obtaining a very compact device requiring but little space on a desk or counter.

From the foregoing description taken in connection with the accompanying drawings it will be apparent that I provide a sponge cup possessing valuable and practical advantages over the kinds used at present, and of very cheap and simple manufacture. As will be easily understood there may be made slight changes in the design of the cup, such as making it polygonal instead of circular, and I do not wish to limit myself to the form described above except as set forth in the claims hereunto appended.

I claim as my invention:

1. As an article of manufacture, a flat bottomed sponge cup having two concentric rims at the top of its side and a drainage groove of variable depth therebetween.

2. As an article of manufacture, a sponge cup having two concentric rims at the top of its side and a drainage groove therebetween possessing a plurality of high and low level points; the level points of equal depth being diametrically opposite.

3. As an article of manufacture, a sponge cup having two concentric rims at the top of its side; the inner rim being of lesser height than the outer rim; a drainage groove therebetween possessing a plurality of high and low level points, the level points of equal depth being diametrically opposite, and apertures provided in the inner rim at points corresponding to the low level points of said groove, substantially as described.

4. As an article of manufacture, a sponge cup having a bottom with a substantially perpendicular wall extending upwardly therefrom around the edge, the upper portion of said wall being divided to form an annular channel at a substantial elevation above the bottom of the sponge cup, and said channel being open at the top and provided with drainage means at the bottom communicating with the interior of the cup.

5. As an article of manufacture, a sponge cup having a substantially flat bottom with a substantially perpendicular wall extending upwardly therefrom around the edge, said wall being divided at the top to form an annular channel at an elevation above the bottom greater than the depth of the channel, and said channel having drainage means at the bottom leading into the interior of the cup.

6. As an article of manufacture, a sponge cup comprising a bottom with a wall extending upwardly therefrom around the edge, said wall being formed at the upper edge with integral inner and outer annular extensions spaced apart to form an annular channel therebetween and having the inner surface of the former and the outer surface of the latter substantially flush with the inner and outer surfaces respectively of the wall, and drainage means leading from the bottom of the channel into the interior of the cup.

7. As an article of manufacture, a sponge cup having a bottom with a wall extending upwardly therefrom around the edge, said wall being provided at the top with integral spaced annular extensions forming a channel therebetween of less width than the thickness of the wall, and said channel having drainage means at the bottom leading into the interior of the cup.

8. As an article of manufacture, a sponge cup of a unitary molded mass of material comprising a bottom with a substantially perpendicular wall extending upwardly therefrom around the edge, said wall gradually decreasing in thickness from the bottom to the top and having a channel in the upper edge gradually increasing in width from the bottom to the top and provided with drainage outlets at the bottom leading into the interior of the cup.

9. As an article of manufacture, a sponge cup of a unitary molded mass of material comprising a bottom with a substantially perpendicular wall extending upwardly therefrom around the edge, and said wall having an annular channel at the top with drainage openings leading into the interior of the cup, the inner and outer surface of said wall being upwardly convergent, and the surfaces at opposite sides of the channel and drainage openings being upwardly divergent.

HUGH L. McGINTY.